(12) United States Patent
Chen et al.

(10) Patent No.: US 10,501,329 B2
(45) Date of Patent: Dec. 10, 2019

(54) MANUFACTURING SYSTEM OF ELECTRONIC-GRADE AMMONIA SOLUTION

(71) Applicant: MEGA UNION TECHNOLOGY INC., Taoyuan (TW)

(72) Inventors: Kuo-Yi Chen, Taoyuan (TW); Shr-Han Shiu, Taoyuan (TW); Yi-Syuan Huang, Taoyuan (TW)

(73) Assignee: MEGA UNION TECHNOLOGY INC., Taoyuan (TW)

( * ) Notice: Subject to any disclaimer, the term of this patent is extended or adjusted under 35 U.S.C. 154(b) by 179 days.

(21) Appl. No.: 15/841,611

(22) Filed: Dec. 14, 2017

(65) Prior Publication Data

US 2019/0144292 A1 May 16, 2019

(30) Foreign Application Priority Data

Nov. 10, 2017 (TW) .............................. 106216794 U

(51) Int. Cl.
| | |
|---|---|
| *C01C 1/02* | (2006.01) |
| *B01D 53/14* | (2006.01) |
| *B01D 5/00* | (2006.01) |
| *B01D 19/00* | (2006.01) |

(52) U.S. Cl.
CPC .............. *C01C 1/024* (2013.01); *B01D 5/003* (2013.01); *B01D 19/0015* (2013.01); *B01D 53/1406* (2013.01); *C01C 1/022* (2013.01)

(58) Field of Classification Search
None
See application file for complete search history.

(56) References Cited

U.S. PATENT DOCUMENTS

| | | | | |
|---|---|---|---|---|
| 9,221,729 B1* | 12/2015 | Lee | .......................... | C07C 15/02 |
| 2010/0229723 A1* | 9/2010 | Gelowitz | ........... | B01D 53/1425 |
| | | | | 95/162 |
| 2013/0247766 A1* | 9/2013 | Oppenheim | ....... | B01D 53/1406 |
| | | | | 96/234 |
| 2016/0115097 A1* | 4/2016 | Tsai | ......................... | C07C 7/005 |
| | | | | 585/802 |
| 2016/0332108 A1* | 11/2016 | O'Rear | .................... | C10L 3/101 |
| 2017/0233301 A1* | 8/2017 | Sharma | .................... | C02F 1/42 |
| | | | | 71/32 |
| 2019/0233296 A1* | 8/2019 | Novek | ...................... | C01C 1/12 |

* cited by examiner

*Primary Examiner* — Tam M Nguyen
(74) *Attorney, Agent, or Firm* — Muncy, Geissler, Olds & Lowe, P.C.

(57) ABSTRACT

A manufacturing system of an electronic-grade ammonia solution comprises: a mixing tank to mix an unsaturated ammonia aqueous solution and alkali to obtain a mixing solution; a stripping unit, disposes downstream the mixing tank and comprises a heat exchanger to heat the mixing solution, and a stripping column to mix a nitrogen gas and the heated mixing solution to obtain a mixing gas; a first absorption unit, disposes downstream the stripping unit and comprises a first condensation unit to cool down the mixing gas, and a first absorption column to mix a saturated ammonia aqueous solution and the cooled mixing gas to obtain a purge gas; and a second absorption unit, disposes downstream the first absorption unit and comprises a second condensation unit to cool down a DI water, and a second absorption column to mix the cooled DI water and the purge gas to obtain electronic-grade ammonia solution.

11 Claims, 2 Drawing Sheets

MANUFACTURING SYSTEM OF ELECTRONIC-GRADE AMMONIA SOLUTION

BACKGROUND OF THE INVENTION

1. Field of the Invention

The present invention relates to a manufacturing system of an electronic-grade ammonia solution, particularly to a manufacturing system using unsaturated ammonia solution to generate electronic-grade ammonia solution.

2. Description of the Prior Art

In the current semiconductor industry, the etching and flushing processes usually generate a great amount of waste ammonia solution. The ordinary method of processing waste ammonia solution is the stripping method, wherein sulfuric acid is absorbed by ammonia-containing waste liquid to form ammonium sulfate-containing waste liquid. The ammonium sulfate-containing waste liquid is dried and further processed for applications. However, the ammonium sulfate generated by the abovementioned method is an industry-grade product, unlikely to be used as agricultural fertilizer. Therefore, the product of the sulfuric acid-based method not only needs subsequent treatment but also has limited application. Accordingly, the present invention proposes a simple method of processing waste ammonia solution to avoid redundant processing procedures, decrease the cost of processing waste liquid, and favor the pollution control of semiconductor industry.

SUMMARY OF THE INVENTION

One objective of the present invention is to provide a manufacturing system of an electronic-grade ammonia solution, which comprises a mixing tank used to mix unsaturated ammonia solution ($NH_4OH$) and alkali to form a mixing solution; a stripping unit disposed in the downstream of the mixing tank and including a heat exchanger and a stripping column, wherein the heat exchanger is used to heat the mixing solution, and wherein the stripping column is used to mix nitrogen and the heated mixing solution and undertake stripping to obtain a mixing gas; a first absorption unit disposed in the downstream of the stripping unit and including a first condensation unit and a first absorption column, wherein the first condensation unit is used to cool down the mixing gas, and wherein the first absorption column is used to mix saturated ammonia solution and the cooled mixing gas and undertake absorption to obtain a purge gas; and a second absorption unit disposed in the downstream of the first absorption unit and including a second condensation unit and a second absorption column, wherein the second condensation unit is used to cool down a deionized (DI) water, and wherein the second absorption column is used to mix the cooled DI water and the purge gas to obtain an electronic-grade ammonia solution.

In one embodiment, the concentration of ammonia in the ammonia solution is 20-30%.

In one embodiment, the saturated ammonia solution is at a temperature of 10-30° C. and a pressure of 1-5 atm.

In one embodiment, the condensing temperature of the first condensation unit is 25-40° C., and the condensing temperature of the second condensation unit is 7-20° C.

In one embodiment, the concentration of metal ions in the electronic-grade ammonia solution is 1-10 ppt.

In one embodiment, the pH value of the mixing solution is 10-12.

Another objective of the present invention is to provide a manufacturing system of an electronic-grade ammonia solution, which comprises a mixing tank used to mix unsaturated ammonia solution ($NH_4OH$) and alkali to form a mixing solution; a stripping unit disposed in the downstream of the mixing tank and including a heat exchanger and a stripping column, wherein the heat exchanger is used to heat the mixing solution, and wherein the stripping column is used to mix nitrogen and the heated mixing solution and undertake stripping to obtain a mixing gas; a purification unit disposed in the downstream of the stripping unit and including a first condensation unit and a deoxidization film, wherein the first condensation unit is used to cool down the mixing gas, and wherein the cooled mixing gas flows through the deoxidization film to obtain a purge gas; and an absorption unit disposed in the downstream of the purification unit and including a second condensation unit and an absorption column, wherein the second condensation unit is used to cool down an deionized (DI) water, and wherein the absorption column is used to mix the cooled DI water and the purge gas to obtain an electronic-grade ammonia solution.

In one embodiment, the concentration of ammonia in the ammonia solution is 20-30%.

In one embodiment, the saturated ammonia solution is at a temperature of 10-30° C. and a pressure of 1-5 atm.

In one embodiment, the condensing temperature of the first condensation unit is 25-40° C., and the condensing temperature of the second condensation unit is 7-20° C.

In one embodiment, the concentration of metal ions in the electronic-grade ammonia solution is 1-10 ppt.

In one embodiment, the pH value of the mixing solution is 10-12.

Below, embodiments are described in detail in cooperation with the attached drawings to make easily understood the objectives, technical contents, characteristics and accomplishments of the present invention.

DESCRIPTION OF THE PREFERRED EMBODIMENTS

Figure 1:
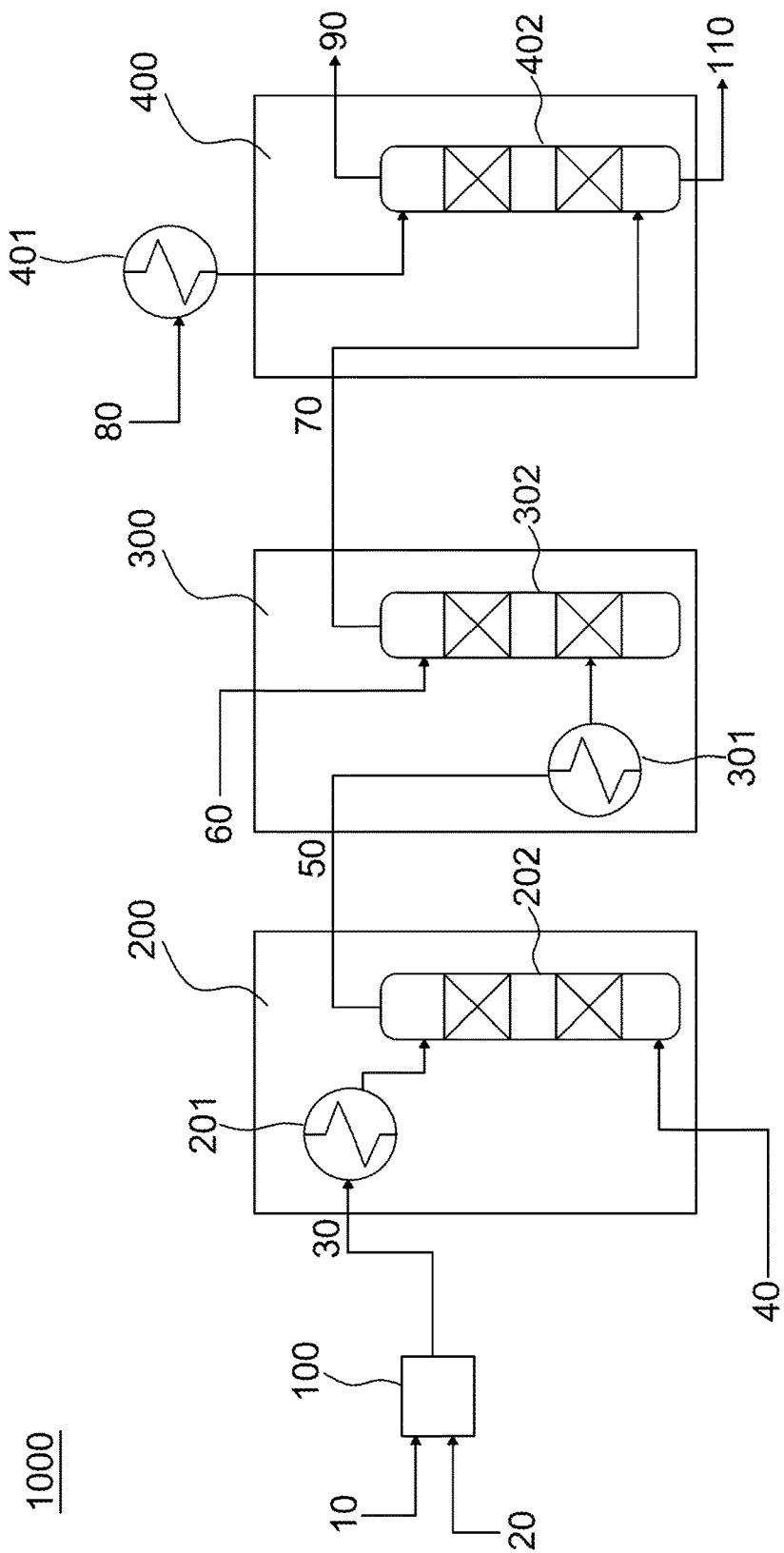
FIG. 1 is a diagram schematically a manufacturing system of an electronic-grade ammonia solution according to one embodiment of the present invention.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Refer to FIG. 1 a diagram schematically a manufacturing system of an electronic-grade ammonia solution according to one embodiment of the present invention. The manufacturing system 1000 of the present invention comprises a mixing tank 100, a stripping unit 200, a first absorption unit 300, and a second absorption unit 400. The mixing tank 100 is used to mix an ammonia ($NH_4OH$) solution 10 and an alkali (NaOH) 20 to form a mixing solution 30. The pH value of the mixing solution 30 is 10-12. The ammonia solution 10 is an unsaturated solution of ammonia. The concentration of ammonia in the ammonia solution 10 is 20-30%, preferably 25%. The unsaturated ammonia solution, which has a lower pH value, cannot be gasified (converted into ammonia gas) unless it is at a higher temperature. In this embodiment, the pH value of the mixing solution 30 is increased to a specified value (10-12), whereby the ammonia solution can be converted into ammonia gas for stripping at not too high a temperature, wherefore the fabrication efficiency is increased and the temperature control cost is decreased. The stripping unit 200 is disposed in the downstream of the mixing tank 10 and includes a heat exchanger 201 and a stripping column 202. The heat exchanger 201 is used to heat the mixing solution 30 to a temperature of 60-90° C. The stripping column 202 is used to mix nitrogen 40 and the heated mixing solution 30 to undertake stripping to obtain a mixing gas 50. The stripping column can increase the contact area between the gas and the liquid and favor stripping ammonia.

Next, the mixing gas 50 is conducted to the first absorption unit 300. The first absorption unit 300 is disposed in the downstream of the stripping unit 200 and includes a first condensation unit 301 and a first absorption column 302. The first condensation unit 301 is used to cool down the mixing gas 50. The condensing temperature of the first condensation unit 301 is 25-40° C. Thereby, a portion of water is removed in this stage. The first absorption column 302 is used to mix saturated ammonia solution 60 and the cooled mixing gas 50 and undertake absorption to obtain a purge gas 70. In this stage, the saturated ammonia solution 60 is at a temperature of 10-30° C. and a pressure of 1-5 atm. In this stage, the concentration of ammonia in the saturated ammonia solution 60 is preferably 29%. The saturated ammonia solution 60 can absorb impurities in the mixing gas 50, such as water and metal ions, whereby is achieved a superior stripping effect.

Then, the purge gas 70 is conducted to the second absorption unit 400. The second absorption unit 400 is disposed in the downstream of the first absorption unit 300 and includes a second condensation unit 401 and a second absorption column 402. The second condensation unit 401 is used to cool down a deionized (DI) water 80. The condensing temperature of the second condensation unit 401 is 7-20° C. The second absorption column 402 is used to mix the cooled DI water 80 and the purge gas 70 to obtain an electronic-grade ammonia solution 110. The concentration of metal ions in the electronic-grade ammonia solution 110 is 1-10 ppt, preferably 1 ppt. A tail gas 90 is exhausted from the top of the second absorption column 402.

Figure 2:
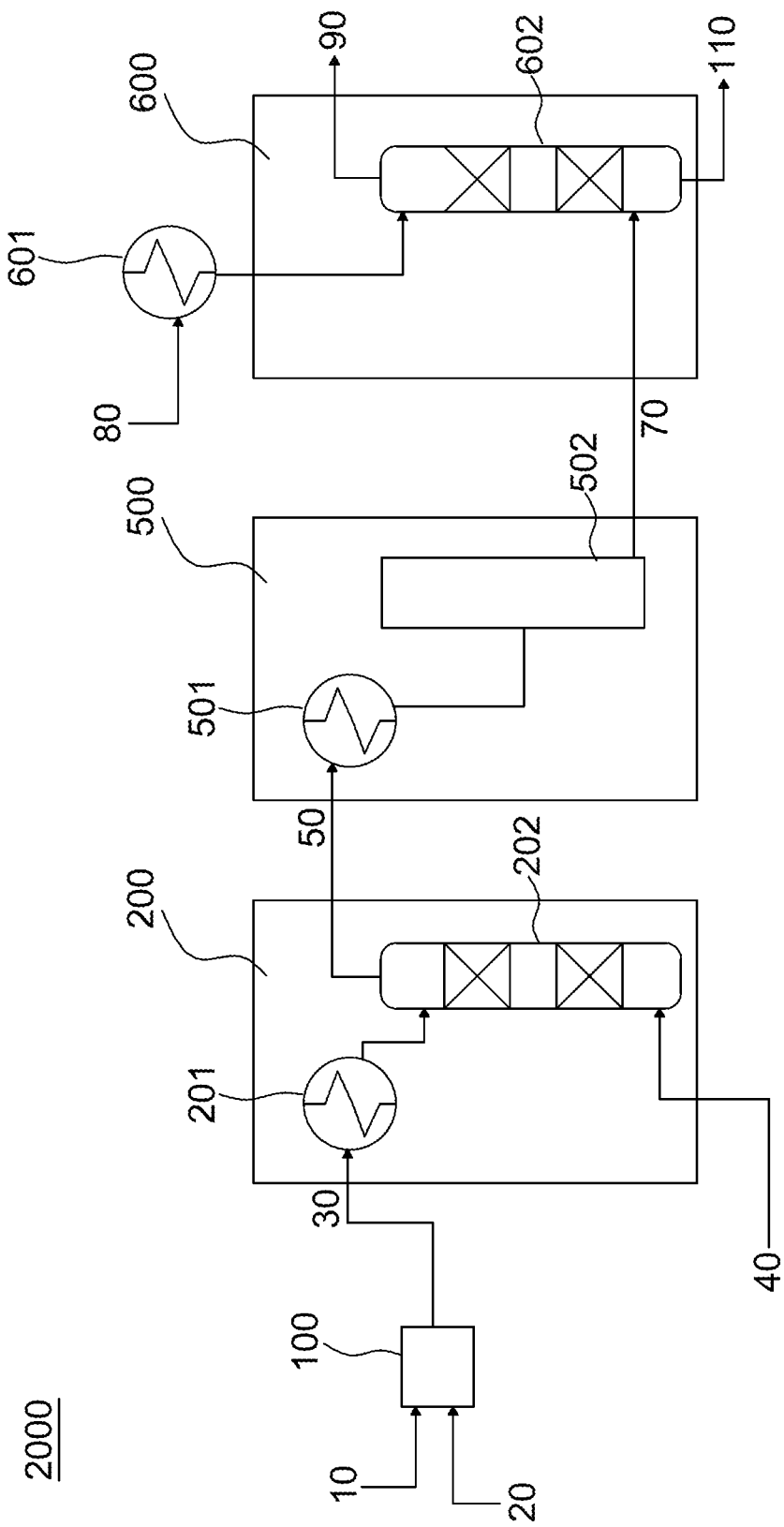
FIG. 2 is a diagram schematically a manufacturing system of an electronic-grade ammonia solution according to another embodiment of the present invention.

Refer to FIG. 2 a diagram schematically a manufacturing system of an electronic-grade ammonia solution according to another embodiment of the present invention. The manufacturing system 2000 of the present invention comprises a mixing tank 100, a stripping unit 200, a purification unit 500, and an absorption unit 600. The mixing tank 100 is used to mix an ammonia ($NH_4OH$) solution 10 and an alkali (NaOH) 20 to form a mixing solution 30. The pH value of the mixing solution 30 is 10-12. The ammonia solution 10 is an unsaturated solution of ammonia. The concentration of ammonia in the ammonia solution 10 is 20-30%, preferably 25%. The unsaturated ammonia solution, which has a lower pH value, cannot be gasified (converted into ammonia gas) unless it is at a higher temperature. In this embodiment, the pH value of the mixing solution 30 is increased to a specified value (10-12), whereby the ammonia solution can be converted into ammonia gas for stripping at not too high a temperature, wherefore the fabrication efficiency is increased and the temperature control cost is decreased. The stripping unit 200 is disposed in the downstream of the mixing tank 10 and includes a heat exchanger 201 and a stripping column 202. The heat exchanger 201 is used to heat the mixing solution 30 to a temperature of 60-90° C. The stripping column 202 is used to mix nitrogen 40 and the heated mixing solution 30 and undertake stripping to obtain a mixing gas 50. The stripping column can increase the contact area between the gas and the liquid and favor stripping ammonia.

Next, the mixing gas 50 is conducted to the purification unit 500. The purification unit 500 is disposed in the downstream of the stripping unit 200 and includes a first condensation unit 501 and a deoxidization film 502. The first condensation unit 501 is used to cool down the mixing gas 50. The condensing temperature of the first condensation unit 501 is 25-40° C. Thereby, a portion of water is removed in this stage. The cooled mixing gas 50 flows through the deoxidization film 502 to obtain a purge gas 70. The deoxidization film 502 can remove impurities in the mixing gas 50, such as metal ions.

Then, the purge gas 70 is conducted to the absorption unit 600. The absorption unit 600 is disposed in the downstream of the purification unit 500 and includes a second condensation unit 601 and an absorption column 602. The second condensation unit 601 is used to cool down a deionized (DI) water 80. The condensing temperature of the second condensation unit 601 is 7-20° C. The absorption column 602 is used to mix the cooled DI water 80 and the purge gas 70 to obtain an electronic-grade ammonia solution 110. The concentration of metal ions in the electronic-grade ammonia solution 110 is 1-10 ppt, preferably 1 ppt. A tail gas 90 is exhausted from the top of the second absorption column 602.

In one embodiment of the manufacturing system of an electronic-grade ammonia solution of the present invention conducts an unsaturated ammonia solution having a concentration of 20-30% through a stripping unit, a first absorption unit and a second absorption unit in sequence, wherein saturated ammonia solution is used to strip impurities, such as water and metal ions, whereby is obtained an electronic-grade ammonia solution having a low concentration of metal ions. In another embodiment of the manufacturing system of an electronic-grade ammonia solution of the present invention conducts an unsaturated ammonia solution having a concentration of 20-30% through a stripping unit, a purification unit and an absorption unit in sequence, wherein a deoxidization film is used to remove ammonia gas and impurities, whereby is obtained an electronic-grade ammonia solution having a low concentration of metal ions.

Generally speaking, the higher the precision of the fabrication process, the higher the demand to the quality of the electronic-grade ammonia solution. For the semiconductor industry, the demand to the electronic-grade ammonia solution is that the concentration of meal ions should be below 10 ppt. Via using saturated ammonia solution to absorb metal ions, the present invention can produce an electronic-grade ammonia solution having a metal-ion concentration of as low as 1-10 ppt. Therefore, the product of the present invention can meet the demand of the semiconductor industry.

What is claimed is:

1. A manufacturing system of an electronic-grade ammonia solution, comprising
    a mixing tank used to mix an ammonia solution and an alkali to form a mixing solution, wherein the ammonia solution is an unsaturated solution;
    a stripping unit disposed in a downstream of the mixing tank and including a heat exchanger and a stripping column, wherein the heat exchanger is used to heat the mixing solution, and wherein the stripping column is used to mix nitrogen and the heated mixing solution and undertake stripping to obtain a mixing gas;
    a first absorption unit disposed in a downstream of the stripping unit and including a first condensation unit and a first absorption column, wherein the first condensation unit is used to cool down the mixing gas, and wherein the first absorption column is used to mix saturated ammonia solution and the cooled mixing gas and undertake absorption to obtain a purge gas; and
    a second absorption unit disposed in a downstream of the first absorption unit and including a second condensation unit and a second absorption column, wherein the second condensation unit is used to cool down a deionized (DI) water, and wherein the second absorption column is used to mix the cooled DI water and the purge gas to obtain an electronic-grade ammonia solution.

2. The manufacturing system of an electronic-grade ammonia solution according to claim 1, wherein a concentration of ammonia in the ammonia solution is 20-30%.

3. The manufacturing system of an electronic-grade ammonia solution according to claim 1, wherein the saturated ammonia solution is at a temperature of 10-30° C. and a pressure of 1-5 atm.

4. The manufacturing system of an electronic-grade ammonia solution according to claim 1, wherein the first condensation unit has a condensing temperature of 25-40° C., and the second condensation unit has a condensing temperature of 7-20° C.

5. The manufacturing system of an electronic-grade ammonia solution according to claim 1, wherein a concentration of metal ions in the electronic-grade ammonia solution is 1-10 ppt.

6. The manufacturing system of an electronic-grade ammonia solution according to claim 1, wherein the mixing solution has a pH value of 10-12.

7. A manufacturing system of an electronic-grade ammonia solution, comprising
    a mixing tank used to mix an ammonia solution and an alkali to form a mixing solution, wherein the ammonia solution is an unsaturated solution;
    a stripping unit disposed in a downstream of the mixing tank and including a heat exchanger and a stripping column, wherein the heat exchanger is used to heat the mixing solution, and wherein the stripping column is used to mix nitrogen and the heated mixing solution and undertake stripping to obtain a mixing gas;
    a purification unit disposed in a downstream of the stripping unit and including a first condensation unit and a deoxidization film, wherein the first condensation unit is used to cool down the mixing gas, and wherein the cooled mixing gas flows through the deoxidization film to obtain a purge gas; and
    an absorption unit disposed in a downstream of the purification unit and including a second condensation unit and an absorption column, wherein the second condensation unit is used to cool down an deionized (DI) water, and wherein the absorption column is used to mix the cooled DI water and the purge gas to obtain an electronic-grade ammonia solution.

8. The manufacturing system of an electronic-grade ammonia solution according to claim 7, wherein a concentration of ammonia in the ammonia solution is 20-30%.

9. The manufacturing system of an electronic-grade ammonia solution according to claim 7, wherein the first condensation unit has a condensing temperature of 25-40° C., and the second condensation unit has a condensing temperature of 7-20° C.

10. The manufacturing system of an electronic-grade ammonia solution according to claim 7, wherein a concentration of metal ions in the electronic-grade ammonia solution is 1-10 ppt.

11. The manufacturing system of an electronic-grade ammonia solution according to claim 7, wherein the mixing solution has a pH value of 10-12.

* * * * *